United States Patent [19]

Karger et al.

[11] 4,374,811
[45] Feb. 22, 1983

[54] METHOD FOR COOLING AND SEPARATING CHLORIDES AND FLUORIDES FROM AMMONIACAL GAS

[75] Inventors: Robert Karger, Dortmund; Horst Dungs, Herne, both of Fed. Rep. of Germany

[73] Assignee: Firma Carl Still GmbH and Co. KG, Fed. Rep. of Germany

[21] Appl. No.: 191,014

[22] Filed: Sep. 26, 1980

[30] Foreign Application Priority Data

Oct. 5, 1979 [DE] Fed. Rep. of Germany ....... 2940412

[51] Int. Cl.³ ............................................ B01D 53/34
[52] U.S. Cl. ..................................... 423/240; 423/238; 423/241; 422/169; 422/173; 422/189; 422/198
[58] Field of Search ............... 423/220, 234, 238, 232, 423/228, 229, 240, 352, 241; 422/169, 173, 189, 198

[56] References Cited

U.S. PATENT DOCUMENTS

| | | | |
|---|---|---|---|
| 2,878,099 | 3/1959 | Breuing et al. | 423/233 |
| 3,186,795 | 6/1965 | Fields | 423/238 X |
| 3,565,573 | 2/1971 | Thirkell | 423/229 X |
| 4,088,735 | 5/1978 | Bratzler et al. | 423/240 R |
| 4,208,381 | 6/1980 | Isahaya et al. | 423/240 R |
| 4,213,945 | 7/1980 | Haese et al. | 423/240 |

*Primary Examiner*—Earl C. Thomas
*Attorney, Agent, or Firm*—McGlew and Tuttle

[57] ABSTRACT

A method and device of cooling and separating chlorides and fluorides from ammoniacal gas produced in the carbonization gasification of coal includes the addition of an aqueous salt solution having a concentration of at least one of chlorine and fluorine ions up to saturation to the ammoniacal gas in a color to form a salt solution enriched with chlorides, fluorides and ammonia compounds and a treated gas, and removing at least part of the enriched solution from the cooler.

22 Claims, 3 Drawing Figures

METHOD FOR COOLING AND SEPARATING CHLORIDES AND FLUORIDES FROM AMMONIACAL GAS

FIELD AND BACKGROUND OF THE INVENTION

The invention relates, in general, to coal gasification and, more particularly, to a method and apparatus for cooling and separating chlorides and fluorides from ammonical gas particularly from coal carbonization or gasification gas.

Aside from the acid components-$CO_2$, $H_2S$, HCN, the gas obtained during coal carbonization or gasification also contains HCl, HF and $NH_3$ in varying concentrations, depending upon the characteristics of the charged coal and the operating conditions.

In treating the gas for use as fuel or synthesis gas, the acid components are substantially removed in physical or chemical wet scrubbing processes. Advance separation of chlorides and fluorides is a prerequisite for the application of wet scrubbing to remove sulfur or carbon dioxide in order to keep the chloride and fluoride concentration in the scrubbing circuit at a tolerable level, without the necessity of removing the wash liquor. The removal of wash liquor must be avoided since, irrespective of the costs of resupplying with fresh liquor, disposal of the removed amounts is very expensive if environmental protection is to to be observed. Wet processes for removing sulfur and carbon dioxide, furthermore, require a preliminary cooling of the gas to a temperature ranging from 30° C. to 100° C. prior to its introduction into the scrubber.

With an indirect gas cooling by means of heat exchangers, gaseous $NH_3$ and HCl will form solid $NH_4Cl$ which deposits on the surfaces of the cooler. This requires periodic solid removal. Therefore, a continuous operation is not possible with such heat exchangers. In addition, depending on the vapor pressure of $NH_4Cl$ (p $NH_3$+p HCL), chlorides are only partly removed. Therefore, to obtain the required small residual amounts of chlorides and fluorides, wet scrubbers or wet electrofilters are needed for further separation. This results in increased equipment and operating costs.

Attempts have been made to directly cool and separate the gas in the scrubbers by water evaporation and, at the same time, to separate the chlorides and fluorides. Fresh water is supplied for this purpose into the washing circuit. The $NH_3$ contained in the gas combines with the acid gas components, preferably with HCl and HF. However, with direct cooling of the gases by water evaporation. $NH_4Cl$ and $NH_4F$ aerosols form from a part of the $NH_3$, HCl, and HF and the evaporated drops of the solution, and a considerable amount of energy is required for further separation.

SUMMARY OF THE INVENTION

The invention is directed to a method and device permitting a continuous operation without an excessive formation of aerosols, so that the formed aerosols can be taken up with a very small gas pressure loss, by the circuit salt solution.

In accordance with the invention, the gas is treated in a cooler, preferably a direct cooler, with a concentrated salt solution containing chlorine or flourine ions or both as residual acidity and at least a part of the salt solution enriched with chlorides, fluorides and ammonia compounds is removed.

The concentration of the salt solution may be adjusted close to saturation at the temperature of the cooling circuit such concentration shall be characterized in the specification and claims as a high concentration, i.e. meaning at or close to saturation. With a direct cooling, the $NH_4Cl$ and $NH_4F$, formed in the gaseous phase primarily by the sublimation on the cold liquid film, are separated and dissolved in the salt solution. In parallel to the sublimation of $NH_4Cl$ or $NH_4F$, or both, unconverted HCl and/or HF in the gas is absorbed by an absorbent added to the gas and the $NH_3$, freed from the gas, is dissolved in the salt solution. The high concentration of the salt solution makes possible an economic transformation of the removed part of the solution to a salt sludge or dry salt, through the application of heat. With an appropriate packaging, these products may be deposited without environmental impact shipped to an industrial utilization. Further, the inventive cooling stage makes possible the introduction of extraneous acidic or alkaline waste waters which may be concentrated in the salt solution. The water introduced with the extraneous wash water is consumed during the saturation of the gas to be treated. The salts resulting from the extraneous waste water are removed along with the chlorides and fluorides separated from the gas.

In accordance with an advantageous feature of the inventive method, the gas is treated in a scrubber, installed downstream of the direct cooler, with a low-concentration salt solution containing chloride or fluoride ions, or both, as residual acidity, and at least a part of of the salt solution, enriched with chlorides and fluorides and ammonia compounds, is removed. In the scrubber, into which the gas coming from the cooler passes with a temperature close to the point of condensation, the residual chlorides and fluorides are separated. The residual acid gas components such as $CO_2$, $H_2S$ and HCN can be removed in accordance with their partial pressures above the wash liquor.

The inventive method can be carried out in a particularly advantageous and economic manner, if the salt solution and the gas are conducted through the cooler or scrubber, or both, countercurrently and the salt solution is recycled in a closed circuit. A portion of the salt solution is continually removed and replaced with a corresponding amount of fresh water in order to keep the concentration of the salt solution constant.

Depending upon the composition of the gas to be treated, and especially where the gas contains a little $NH_3$, a gaseous absorbent, preferably $NH_3$, may be supplied into the direct cooler and/or the scrubber. In such a case, during the cooling in the direct cooler, the $NH_3$ and the gaseous HCl and HF directly form the non-crackable compounds $NH_4Cl$ and $NH_4F$ which dissolve in the salt solution. Volatile salts, such as ammonium carbonate, ammonium sulfide and ammonium cyanide, also produced in the cooling circuit, are removed and then thermally decomposed elsewhere.

The direct cooler and/or the scrubber may also be supplied with an absorbent solution which is preferably added to the salt solution circulating through the cooler and/or scrubber. The absorbent solution may comprise an aqueous solution of $NH_4OH$ or $Ca(OH)_2$ and/or NaOH. By introducing a gaseous $NH_3$ from a stripper into the scrubber, high pH values in the circulating solution can be adjusted, so that with correspondingly small amounts removed, high partial pressures of the acid gas components $CO_2$, $H_2S$, HCN are obtained and their absorption is suppressed, if desired. The addition of $Ca(OH)_2$ or NaOH to the solution circulating through the scrubber affects the $NH_4Cl$ and $NH_4F$ vapor pressures above the salt solution and reduces the tendency to forming aerosols. The salt solution removed from the cooler and/or scrubber circuit is preferably directed to a heated stripper, to thermally decompose the volatile salt compounds and further concentrate the salt solution. Additionally, salt solution from the cooler circuit may be supplied through a bypass line to the stripper. The gases resulting from the volatile salt compounds are directed from the stripper either to the scrubber, or, at least partly, to a further treatment. The same is done with the concentrated salt solution removed from the stripper which, as already mentioned, carries only a minimal waste water, due to the high concentration.

The concentrated salt solution from the stripper may also be supplied to the cooler circuit; then it passes through the direct cooler once more before a portion thereof is removed from the cooling circuit and supplied to a further thermal treatment. This is preferably done in instances where $Ca(OH)_2$ or NaOH is fed into the stripper as the absorbent solution and excess $Ca(OH)_2$ or NaOH is to be supplied along with the concentrated solution to the cooler circuit. In such a case, the stripper is supplied with salt solution removed from the scrubber. The $NH_3$ set free in the stripper is recycled into the scrubber or, at least partly discharged, to a further treatment.

To obtain the required low chloride and fluoride content in the treated gas, the salt solution is conducted in the direct cooler or the scrubber or both, so as to allow the formation of a continuous film of liquid in the part provided with packing material or with nozzles, so that the gas is cooled due to the evaporation of the water from the salt solution, but a complete evaporation of solution droplets is prevented. To this end, it is necessary to avoid spraying of the liquid, especially in the direct cooler, and to conduct the liquid so as to form a continuous liquid film on the column walls, without dry areas. Preferably, the salt solution is fed into the direct cooler through nozzles in drops having a size preventing their complete evaporation.

An inventive device for carrying out the method comprises, in the simplest design, a cooler, preferably direct cooler, or a scrubber connected to a feed line for the gas to be treated, a supply line for distributing the concentrated salt solution in the direct cooler, a discharge line for at least a pair or a salt solution conducted through the direct cooler, and a discharge line for the gas to be treated.

Preferably, however, a scrubber is installed downstream of the direct cooler and forms a unit therewith and is connected to the feed conduit for the gas coming from the direct cooler, a supply line for distributing a low-concentration salt solution, a discharge line for at least a part of the salt solution conducted through the scrubber, and a discharge line for the gas to be treated. In this case, the direct cooler and the scrubber are preferably separated from each other by an overflow bottom.

To circulate the salt solution through the scrubber and the direct cooler, connecting lines, each is equipped with a circulating pump provided between the respective discharge and supply lines for the salt solutions. The gas stream to be treated and the stream of cooling or washing liquid are preferably directed countercurrently. A design with countercurrents in the direct cooler and unidirectional currents in the scrubber, or conversely, or with unidirectional currents in both, is also possible.

In order to bring the gas to be treated to the partly required temperature of 30° C., a coolant operated heat exchanger is provided in the scrubbing circuit. For supplying the direct cooler and/or the scrubber with a gaseous absorbent, corresponding supply lines are provided in the vicinity of the line feeding the gas to be treated into the cooler, and in the zone where the gas passes from the cooler into the scrubber.

The direct cooler and/or the scrubber are further connected to supply lines for an absorbent solution permitting to supply the cooler or scrubber with various absorbents without causing an interference in their effect.

A cooler circuit and/or the scrubber circuit is connected to a stripper provided with a heater, from which the concentrated salt solution and thermally decomposed gases are discharged. Due to the heating, the concentrated salt solution has a high temperature and this heat may be utilized in a heat exchanger for treating the salt solution coming from the cooler circuit and/or scrubber circuit.

The concentrated salt solution removed from the stripper may be recycled into the cooler circuit or directed to an equipment for preparing the salt solution. If the salt solution is recycled, the stripper is connected to at least one absorbent supply line provided in the zone of the salt solution supply line, to make it possible to supply the cooler circuit with another absorbent than the scrubber circuit.

Depending on the desired or required conduction of the process in view of the composition of the gas to be treated, the discharge line for cracked gases of the stripper may be connected to the conduit through which the gas passes from the cooler to the scrubber, and/or to an installation for treatment of the thermally decomposed gases.

Accordingly, it is an object of the invention to provide a method of cooling and separating chlorides and fluorides from ammoniacal gas produced in the carbonization or gasification of coal which includes the steps of adding an aqueous salt solution having a concentration of at least one of chlorine and fluorine ions up to saturation to the ammoniacal gas in a cooler to form a first salt solution enriched with chlorides, fluorides and ammonia compounds and a treated gas, and removing at least part of the enriched solution from the cooler. In accordance with a preferred embodiment of the invention, the inventive technique includes passing the treated gas to a scrubber, scrubbing the treated gas with an aqueous solution having a low concentration of at least one of chlorine or fluorine ions to form a second solution enriched with chlorides, fluorides and ammonia compounds. The aqueous salt solution and the gas are preferably conducted through the cooler and/or the scrubber countercurrently. It is a further object of the invention to provide an apparatus arrangement for carrying out the inventive method.

It is still a further object of the invention to provide a device and a method for cooling and separating chlorides and fluorides from ammoniacal gas produced in the carbonization or gasification of coal which is simple in design, rugged in construction and economical to manufacture and operate.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
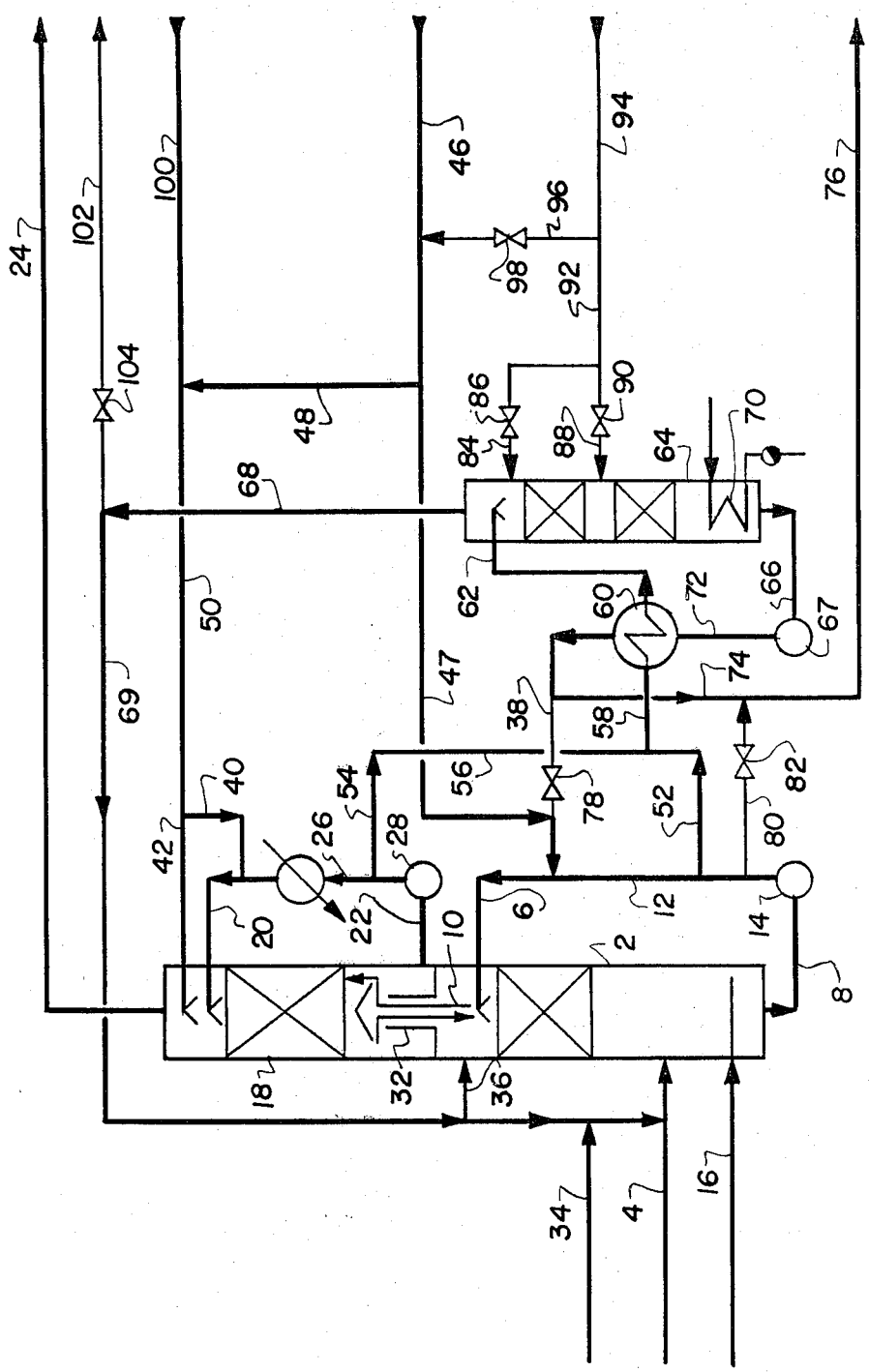
FIG. 1 is a schematic apparatus arrangement, according to the invention, and flow diagram illustrating the operational alignment of the arrangement in accordance with a preferred embodiment via bold face flow lines.

The inventive device comprises a direct cooler 2 connected to a feed line 4 for the gas to be treated, and a supply line 6 provided at the top of the cooler 2 and a discharge line 8 provided at the bottom of the cooler 2 for, respectively, supplying and discharging a concentration salt solution. The gas to be treated leaves the cooler through a discharge conduit 10 provided above supply line 6.

A line 12, equipped with a circulating pump 14, is provided between discharge line 8 and supply line 6. At its bottom, direct cooler 2 is connected to a supply line 16 for extraneous waste waters which mix with the circulated salt solution and are concentrated along therewith. A scrubber 18 of similar design is provided above direct cooler 2. Cooler 2 and scrubber 18 form a column. A supply line 20 and a discharge line 22 for a low-concentration salt solution are provided at the top and the bottom of scrubber 18, respectively. The top of scrubber 18 is further connected to a discharge line 24 for the treated gas that has passed from cooler 2 into the scrubber 18 through conduit 10. A connecting line 26 equipped with a circulating pump 28 for the salt solution is provided between discharge line 22 and supply line 20.

Cooler 2 and scrubber 18 are separated in the column from each other by an overflow bottom 32 through which conduit 10 for the gas treated in cooler 2 is passed. Through the conduit 10, salt solution from scrubber 18 flows into cooler 2 as soon as the liquid level rises to the overflow edge. A supply line 34 for a gaseous absorbent, more particularly $NH_3$ gas, is connected to gas feed line 4 through a line 69. A feed pipe 36 is branched off line 34, permitting the feed of a gaseous absorbent, again $NH_3$ gas in the present example, directly into the gas stream passing from cooler 2 into scrubber 18.

A supply line 38 for an absorbent solution is connected to line 12, and another supply line 40 for an absorbent solution is connected to line 26. The absorbent solution may also be fed into scrubber 18 directly, through another line 42. A line 46 for an aqueous solution of $NH_4OH$ is connected, through a line 47, to line 38 and, through lines 48 and 50, to supply lines 40 and 42 of the scrubber circuit. Further, a discharge line 52 is branched off connecting line 12 of the cooler circuit and a discharge line 54 is branched off connecting line 26 of the scrubber circuit. The two discharge lines 52, 54 are connected to each other by a line 56 which, in turn, is connected through a line 58 and a heat exchanger 60 to the supply line 62 of a stripper 64. At the bottom of stripper 64 a drain line 66 for the salt solution has been more concentrated in the stripper, connects through a pump 67, a line 72, heat exchanger 60, a part of line 38, and a line 74, to a discharge line 76 through which the removed concentrated salt solution is directed to further treatment.

Line 38 is equipped with a gate valve 78 permitting to selectively connect drain line 66 of the stripper to connecting line 12 or discharge line 76. Another connection 80 is provided between connecting line 12 and line 74, which can be shut off by means of a gate valve 82. At different levels, the salt $Ca(OH)_2$ or $NaOH$, as absorbent solution, is fed into stripper 64 through a supply line 84 equipped with a gate valve 86, a supply line 88 equipped with a gate valve 86, a supply line 88 equipped with a gate valve 90, a line 92 and a line 94. A connecting line 96 is provided between lines 46 and 94, which can be shut off by a gate valve 98.

A fresh water supply line 100 is connected to lines 48 and 50. The installation further comprises a discharge line 102 with a valve gate 104, for the $NH_3$ gas and the acid compounds $H_2S$, $HCN$, and $CO_2$ separated from the treated gas.

Figure 2:
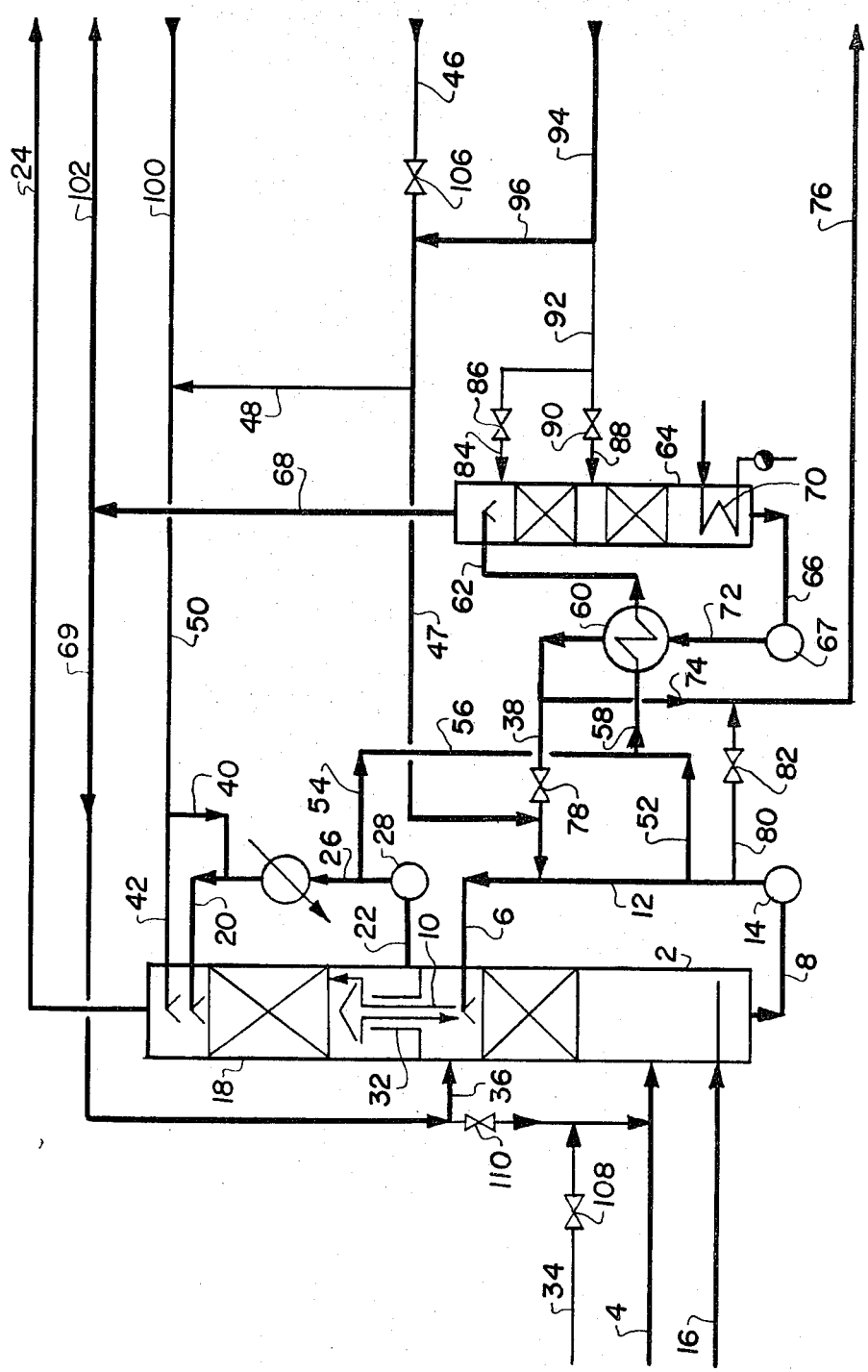
FIG. 2 is a schematic apparatus arrangement, according to an embodiment of the invention, and flow diagram illustrating another preferred operational arrangement according to the technique of the invention via bold face flow lines.

As shown in FIG. 2, supply line 46 for the $NH_4OH$ solution and supply line 34 for the $NH_3$ gas can be shut off by means of gate valve 106 and 108, respectively. Another gate valve 110 is provided in line 69, permitting the interruption of the supply of gaseous $NH_3$ from the stripper to the feed line 4 for the gas to be treated.

Figure 3:
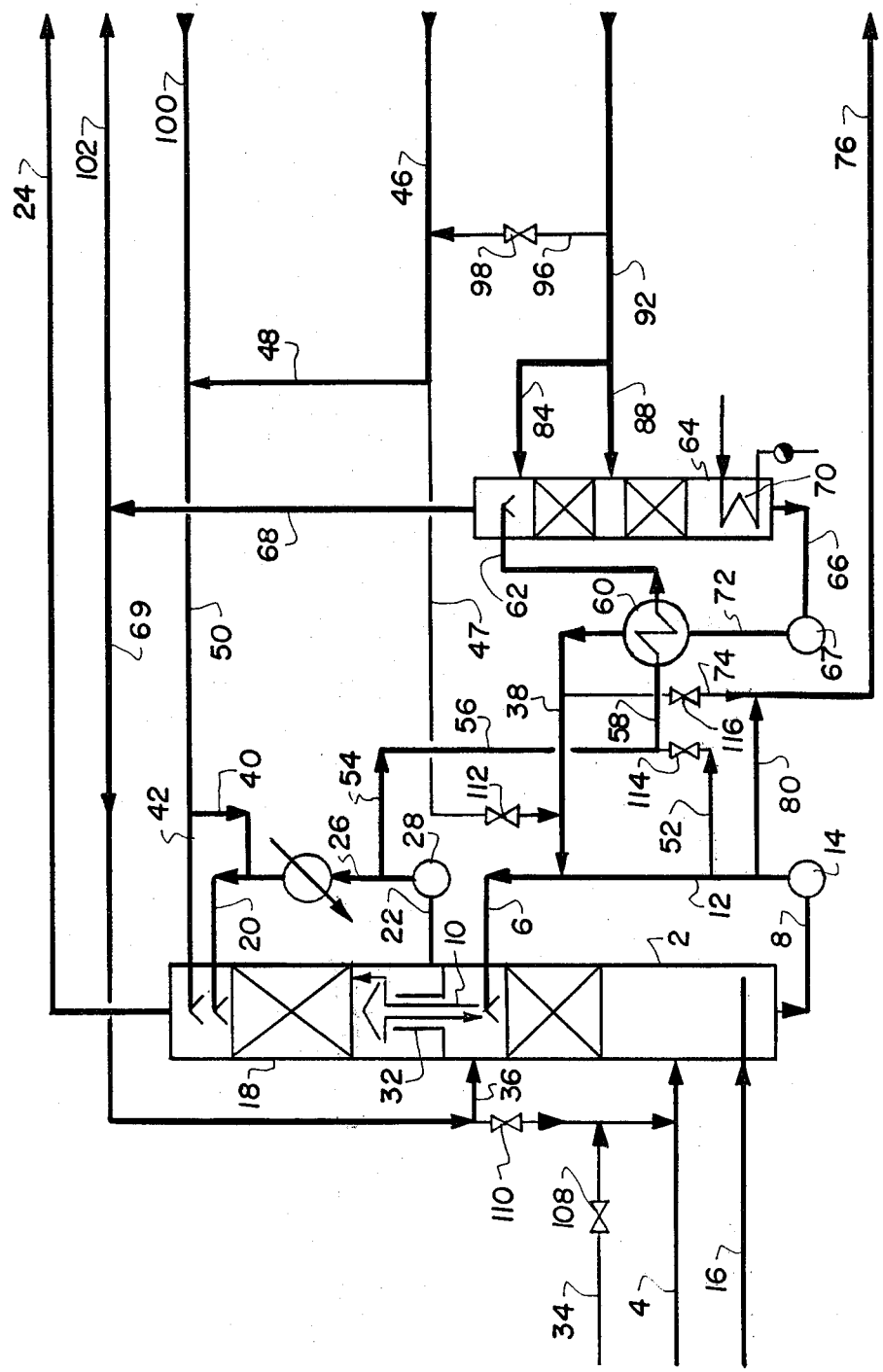
FIG. 3 is a schematic apparatus arrangement, according to still another embodiment of the invention, and flow diagram illustrating still another preferred operation according to the inventive technique via bold face flow lines.

As shown in FIG. 3, line 47 also can be equipped with a valve gate 112 permitting the interruption of a direct supply of the $NH_4OH$ solution from line 46 through line 38 to the cooler circuit. Another gate valve 114 is provided in connecting line 56, permitting the connection from discharge line 52 to line 58 to be interrupted. Further, a gate valve 116, provided in line 74, is intended to shut off the connection between the drain line 66 for the salt solution concentrated in stripper 64 and discharge line 76.

The circuit lines shown in boldface, in each of the respective Figures, are those which are used for the respective variant of the method, while the finer lines represent conduits which are shut off by the respective gate valve.

FIG. 1 shows a variant using $NH_4Cl$ in the cooling and scrubbing circuit. The gas to be treated contains $NH_3$, $HCl$ and $HF$, as well as the acid components $CO_2$, $H_2S$, $HCN$. The gas is fed into direct coolant 2 through line 4. Primarily, the gaseous $NH_3$ contained in the gas to be treated is utilized as absorbent, but if necessary, extraneous $NH_3$ is added through line 34, or $NH_3$ obtained in the stripper 64 is added through lines 68, 69.

In direct cooler 2, the gas is cooled by evaporation of water from the highly concentrated $NH_4Cl$ solution supplied to line 6. The concentrated salt solution is appropriately conducted so as to completely cover all the surfaces and equipment in the cooler with a liquid film, so that no dry areas are left and the droplets of liquid do not completely evaporate. In this way, the formation of $NH_4Cl$ and $NH_4F$ aerosols is suppressed to the largest extent possible. During the cooling, the gaseous $NH_3$ and HCL contained in the gas partly react to form $NH_4Cl$; in a similar way, $NH_4F$ is formed. Both salts precipitate on the liquid film and are dissolved in the salt solution.

Further, the $NH_3$ gas, the HCl gas and the HF gas are directly absorbed by the cooling liquid and react in the liquid while forming the salts $NH_4Cl$ and $NH_4F$. To keep the salt concentration in the cooling circuit constant, a partial stream of the salt solution is continuously removed through line 52.

The scrubbing circuit of scrubber 18 corresponds to the cooling circuit and comprises line 22, circulating pump 28, and lines 26 and 20. The concentration of the salt solution in the scrubber circuit is lower than in the cooler circuit.

By feeding gaseous $NH_3$ through lines 69 and 36 and, if necessary, an $NH_4OH$ solution through lines 46, 48, 50, 40 or 42, the pH value in scrubber 18 can be adjusted to the effect that with correspondingly small amounts removed through overflow bottom 32 into cooler 2, or through 54, sufficiently high partial pressures of the acid components $CO_2$, $H_2S$, HCN in the scrubber circuit are obtained, so that the absorption of these components is suppressed to the largest extent. In such a case, the treated gas leaving scrubber 18 through discharge line 24 contains the unabsorbed $NH_3$ as well as the acid components $CO_2$, $H_2S$ and HCN, which are then removed in a following equipment (not shown).

In the illustrated varient, an $NH_4OH$ solution may be supplied in addition into the cooling circuit, from line 46 through the line 47 and the line 38.

The salt solution removed from the cooler circuit through line 52 and, if necessary, partly from the scrubber circuit through line 54, unite in line 56 and are supplied, through line 58, heat exchanger 60 and line 62, to stripper 64. If no extraneous waste water is introduced through line 16, the salt solution is removed from scrubber 18 only through overflow bottom 22. Line 54 is then shut off by means of a gate valve. Stripper 64 is heated by a heater 70 to an extent ensuring that the volatile salt compounds taken up in the cooling and scrubbing circuits, such as ammonium carbonate, ammonium sulfide, and ammonium cyanide, are cracked. The ammonium compounds which cannot be decomposed at these temperatures, such as $NH_4Cl$ and $NH_4F$, remain in the solution, their concentration is raised, and they are directed through drain line 66, line 72, heat exchanger 60 and lines 74 and 76 to a further thermal treatment. Due to the high concentration of these components in the removed salt solution an economy of treatment in an evaporator, spray drier, or fluidized bed is ensured.

The water in the salt solution removed through line 76 is recirculated either as external waste water through line 16, or as fresh water through line 100.

The extraneous waste water supplied in this process to direct cooler 2 is concentrated in the inventive device, irrespective of whether it is acidic or alkaline. The water introduced with the extraneous waste water is consumed during the saturation of the gas to be treated. The salts resulting from the extraneous waste waters are removed along with the chlorides and fluorides separated from the gas.

In the variant illustrated in FIG. 2, a $Ca(OH)_2$ or NaOH solution is used as absorbent, instead of the gaseous $HN_3$. In this case, as a rule, it is not necessary to add extraneous $NH_3$ gas to the treated gas. Therefore, gate valves 108 and 110 are closed. The $Ca(OH)_2$ or the NaOH solution is supplied through lines 94, 96, 47 and 38 to the cooler circuit and, if necessary, NaOH solution is supplied through lines 48, 50 and 42 to scrubber 18, and through line 40 to the scrubber circuit.

In the cooler circuit, as in the varient according to FIG. 1, the gas is cooled by evaporating water from the circulated salt solution, the $NH_4Cl$ and $NH_4F$ forming in gaseous phase during the cooling precipitate on the liquid film and pass into solution. In solution, the $NH_4Cl$ or $NH_4F$ reacts with the dissolved $Ca(OH)_2$ or NaOH to form $CaCl_2$, NaCl, and $CaF_2$ or NaF. the $NH_3$ gas, and the HF gas are absorbed by the dissolved $Ca(OH)_2$ or NaOH. The salt solution is removed from the cooling and scrubbing circuits again through lines 52, 54 connecting line 56 and line 58, the heat exchanger 60 and line 62, to stripper 64 in which the volatile salt compounds are cracked and the gases thereby formed are directed through discharge line 68 and line 69, 36 to scrubber 18 and through line 102 to further treatment. The salt solution obtained in stripper 64 and containing $CaCl_2$, $CaF_2$ or NaCl, NaF is supplied through drain line 66, pump 67, lines 72, 74, 76 to an evaporator, a spray drier or a fluidized bed. In this case again, the plant is supplied with fresh water through line 100, or with extraneous waste water through line 16.

According to FIG. 3, $NH_4OH$ solution can be supplied to scrubber 18 through line 46, 48, 50, 40 and 42, while $Ca(OH)_2$ or NaOH in solution is supplied to stripper 64 through lines 94, 92, 84 and 88. In this embodiment, only salt solution removed from the scrubber circuit is supplied to stripper 64 through lines 54, 56, 58, heat exchanger 60 and line 62, while the correspondingly more concentrated salt solution from stripper 64 is directed through drain line 66, pump 67, line 72 heat exchanger 60 and line 38 to the cooling circuit. The salt solution supplied to the cooling circuit contains, in addition, excess $Ca(OH)_2$ or NaOH which reacts with the $NH_4Cl$ and $NH_4F$ obtained in the cooling circuit in gaseous phase. The excess $Ca(OH)_2$ or NaOH also serves the purpose of directly absorbing the HCl or HF contained in the gas to be treated. In this way, the concentration of $CaCl_2$, $CaF_2$ or NaCl, NaF in the cooling circuit is increased; a part of the salt solution is removed from the cooling circuit directly, through lines 80 and 76.

The gases obtained in stripper 64, such as $NH_3$, HCN, $H_2S$ and $CO_2$, pass into scrubber 18 through lines 68, 69 and 36 and, through line 102, to a facility for further treatment (not shown).

As evident, the inventive device makes it possible to adapt in a simple way to the composition of the gas to be treated and to obtain the desired concentration of the final products. The distinguishing features of the device operated in accordance with the inventive method are a particularly simple design and high performance with a small consumption of energy.

While specific embodiments of the invention have been shown and described in detail to illustrate the application of the principles of the invention, it will be understood that the invention may be embodied otherwise without departing from such principles.

What is claimed is:

1. A method of cooling and separating chlorides and fluorides from an untreated ammoniacal gas produced in the carbonization or gasification of coal comprising the steps of cooling the gas, said cooling step including directly adding a concentrated aqueous salt solution having a high concentration of at least one of chlorine and fluorine ions close to saturation for the temperature of the solution to the ammoniacal gas in a cooler (a) to form a first salt solution enriched with chlorides, fluorides and ammonia compounds and a treated gas, and (b) removing at least part of the enriched solution from the cooler.

2. A method as set forth in claim 1 further comprising passing the treated gas to a scrubber, scrubbing the treated gas with an aqueous solution having a low concentration of at least one of chlorine or fluorine ions to form a second salt solution enriched with chlorides, fluorides and ammonia compounds.

3. A method as set forth in claim 1 wherein the aqueous salt solution and the gas are conducted through the cooler countercurrently.

4. A method as set forth in claim 2 wherein the aqueous salt solution and the gas are conducted through the cooler and the scrubber countercurrently.

5. A method as set forth in claim 2 wherein the aqueous salt solution and the gas are conducted through the scrubber countercurrently.

6. A method as set forth in claim 1 further comprising passing the salt solution to and from the cooler in a closed circuit.

7. A method as set forth in claim 2 further comprising passing a gaseous absorbent into at least one of the cooler and the scrubber.

8. A method as set forth in claim 7 wherein the gaseous absorbent is $NH_3$.

9. A method as set forth in claim 8 further comprising feeding an absorbent solution into both the cooler and the scrubber.

10. A method as set forth in claim 2 further comprising adding an absorbent solution in to the salt solution circulated in at least one of the cooler and the scrubber.

11. A method as set forth in claim 9 wherein the absorbent comprises dissolved $NH_4OH$.

12. A method as set forth in claim 9 wherein the absorbent comprises at least one of $Ca(OH)_2$ and NaOH.

13. A method as set forth in claim 1 further comprising heat stripping the enriched solution in a stripper to volatilize salt compounds and further concentrate the enriched solution.

14. A method as set forth in claim 2 further comprising heat stripping at least one of the first and second enriched solution in a stripper to volatilize salt compounds to form gases and further concentrate the enriched solution.

15. A method as set forth in claim 14 further comprising adding an absorbent solution to the stripper.

16. A method as set forth in claim 15 wherein the absorbent comprises at least one of $Ca(OH)_2$ and NaOH.

17. A method as set forth in claim 16 comprising feeding the gases yielded from the volatile salt compounds into at least one of the cooler and the scrubber.

18. A method as set forth in claim 17 further comprising adding water to the scrubber.

19. A method as set forth in claim 18 further comprising adding waste water containing salts to the cooler.

20. A method as set forth in claim 18 further comprising forming a continuous liquid film of the salt solution in at least one of the cooler and the scrubber.

21. A method as set forth in claim 1 wherein the step of adding the salt solution comprises feeding the solution into the cooler in drops having a size sufficient to prevent complete evaporation.

22. A method as set forth in claim 1 or 12 or 20, wherein said step of adding a concentrated aqueous salt solution to said cooler comprises forming a continuous fluid film on the walls of said cooler exposed to said untreated gas.

* * * * *